(No Model.)
I. CHURCH.
ANCHOR BOLT.
No. 557,361. Patented Mar. 31, 1896.
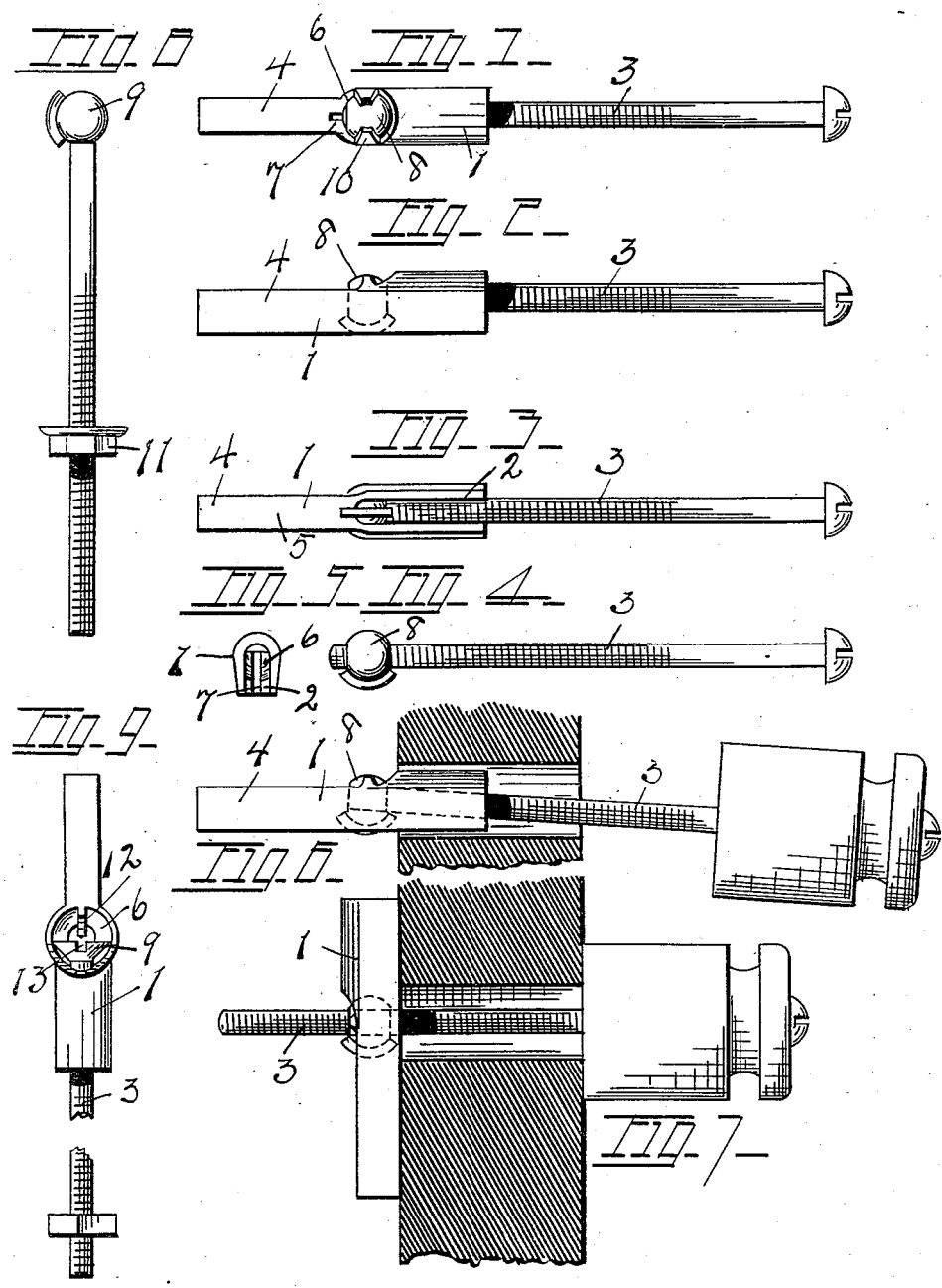
WITNESSES
Carl H. Keller.
Maud Schumacher.
INVENTOR.
Isaac Church
By William Webster
Atty

UNITED STATES PATENT OFFICE.

ISAAC CHURCH, OF TOLEDO, OHIO.

ANCHOR-BOLT.

SPECIFICATION forming part of Letters Patent No. 557,361, dated March 31, 1896.

Application filed September 9, 1895. Serial No. 561,912. (No model.)

*To all whom it may concern:*

Be it known that I, ISAAC CHURCH, of Toledo, county of Lucas, and State of Ohio, have invented certain new and useful Improvements in Anchor-Bolts; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an anchor-bolt of that character employed in securing fixtures of different kinds to walls, ceilings, &c., and has for its object to connect an anchor-bar with a bolt in such manner as to allow the bar to be swung to a plane parallel with the body of the bolt and to turn at a right angle or any other angle thereto with the strain of the bolt centrally of the anchor-bar.

A further object is to provide an anchor-bar having an orifice formed with a hemispherical seat for a hemispherical or spherical nut or bolt-head.

A further object is to provide an anchor-bar constructed with a transverse opening and a hemispherical seat to receive a hemispherical or spherical nut or bolt-head having a peripheral projection and irregularly with a depression or coincident irregularly in the hemispherical seat to prevent revolution of the nut or bolt-head when tension is being put upon the bar.

The invention consists, broadly, in an anchor-bar having an orifice through which the body of the bolt is passed, and a concentric hemispherical seat to receive the nut or bolt-head in a manner to allow the same to oscillate to any desired plane relatively to the body of the bolt.

In the drawings, Figure 1 is a top plan view of an anchor-bolt with an anchor-bar swung to assume a parallel relation with the body of the bolt. Fig. 2 is a side elevation of the same. Fig. 3 is a bottom plan view of the same. Fig. 4 is an elevation of the bolt with the nut run thereon. Fig. 5 is an end view of the anchor-bar, showing the housing end thereof for the bolt. Fig. 6 is an elevation of the bolt and anchor-bar in the act of being passed through an orifice in the wall or ceiling with an ordinary porcelain insulator shown upon the bolt. Fig. 7 is a like view showing the anchor-bar passed through an orifice and swung at a right angle to the bolt with tension upon the bolt. Fig. 8 is an elevation of a modified form of application of my invention, in which the head of the bolt is hemispherical and occupies the hemispherical seat of the anchor-bar in contradistinction to that of the nut occupying this position. Fig. 9 is a top plan view of a modified construction in which an ordinary stove-bolt is employed, the anchor-bar having a conical seat for the conical head of the bolt and a lip or projection to enter the transverse slot of the head of the bolt to prevent the bolt from turning when the nut is being run thereon.

In carrying out my invention I provide an anchor-bar 1, having a channeled end 2 to receive the body of the bolt 3 when in parallel relation thereto, and a solid end 4 preferably of a weight greater than that of the channeled end, the interior face 5 being in the same plane and adapted to bear against the object to which it is anchored.

Centrally or approximately of the anchor-bar is a transverse hole to receive the bolt, and concentrically thereof, in the channel or solid portion of the end 4, is formed a hemispherical seat 6, having a communicating groove 7. Seated within the hemispherical seat 6 is an oscillating nut 8 or bolt-head 9 having a projection to seat within the groove 7 to prevent the same from turning when tension is being put upon the bolt. The nut 8 is secured from falling out of the depression by means of lips or lugs 10, which are bent over the nut when seated.

Referring to Figs. 1 to 7, inclusive, it will be seen that in securing the fixture to the wall or ceiling an ordinary round-headed bolt may be used, and the anchor-bolt housed within the inner side of the wall or ceiling is entirely out of sight, irrespective of the length of the bolt threaded to the hemispherical nut, thereby presenting a smooth and finished appearance upon the interior of the room. It will also be seen that the strain or tension upon the anchor-bolt is central of the width, thereby preventing torsion.

In the modification shown in Fig. 8 the head 9 of the bolt seats within the hemispherical recess and is free to oscillate therein with the tension upon the bolt secured by running the nut 11 upon the threaded portion thereof.

As shown in Fig. 9, an ordinary stove-bolt is employed, and the seat 6 is conical to receive the conical head 9, the conical seat having a projection or lip 12 to enter the groove 13 of the bolt and prevent the bolt from turning when the nut is run upon the bolt.

While I have shown the practical feature of the slot and projection for preventing turning of the nut or bolt, I wish it understood that I may vary this feature largely without departing from the spirit of my invention.

What I claim is—

1. In an anchor-bolt, an anchor-bar formed with a transverse perforation, a seat concentric to the perforation and a longitudinal channel extending from the seat to the end of the bar, a bolt having an enlargement thereto to fit in the seat, and a movement from a right angle to the bar to a position parallel therewith.

2. In an anchor-bolt, an anchor-bar formed with a transverse perforation, a hemispherical seat concentric thereto, a nut housed in the seat to oscillate therein, said anchor-bar being provided with a channel in one end to allow the same to swing parallel with the bolt.

3. In an anchor-bolt, an anchor-bar formed with a channeled end portion and a transverse opening, a hemispherical seat concentric to the opening, and a threaded bolt having a swinging motion with relation to the bar.

4. In an anchor-bolt, a bar having a hemispherical seat, a nut therein, and engaging devices between the bar and nut for preventing revolution of the nut and a bolt screwed into the same.

In testimony that I claim the foregoing as my own I hereby affix my signature in presence of two witnesses.

ISAAC CHURCH.

Witnesses:
  WILLIAM WEBSTER,
  CARL H. KELLER.